United States Patent Office 2,780,118
Patented Feb. 5, 1957

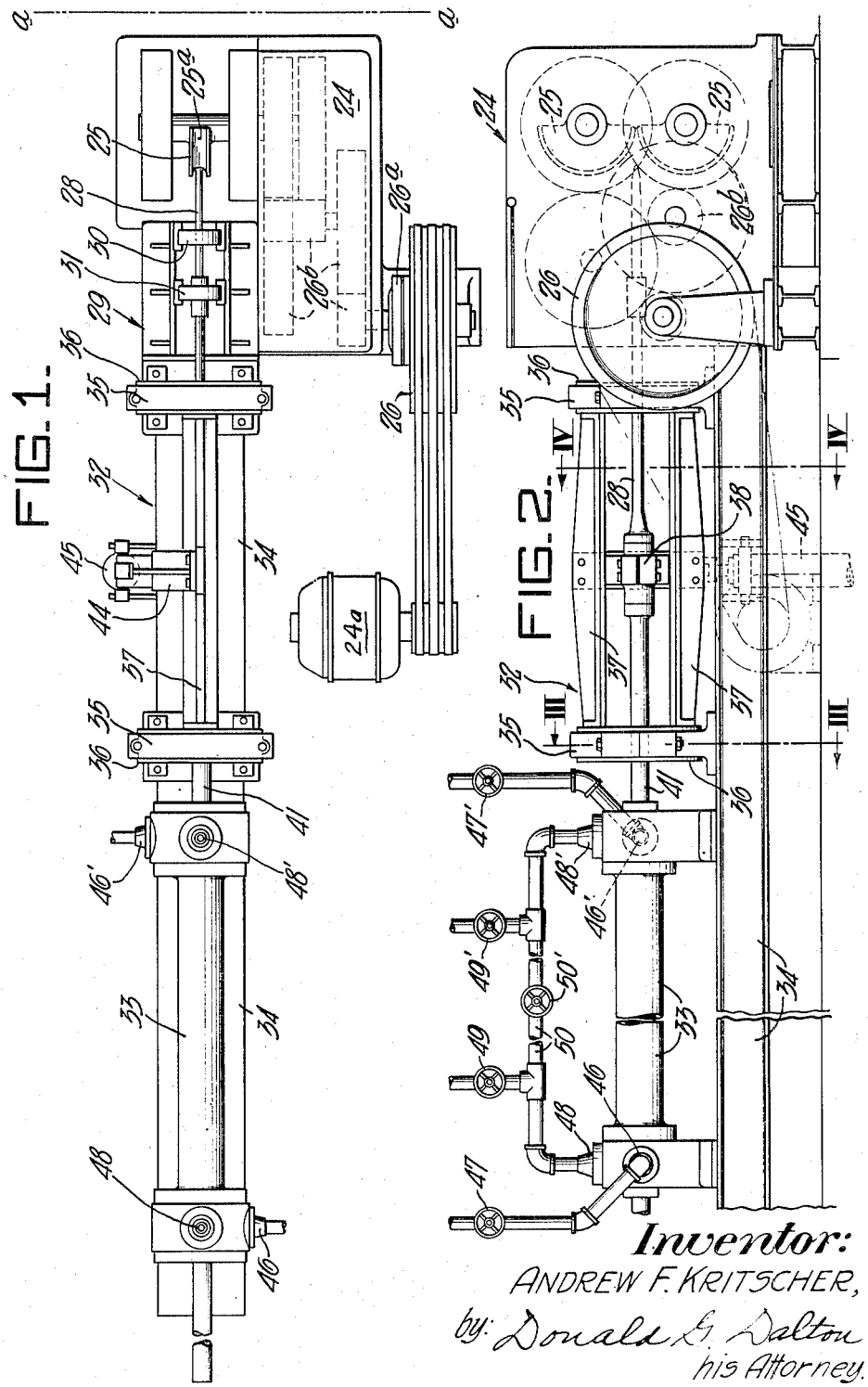

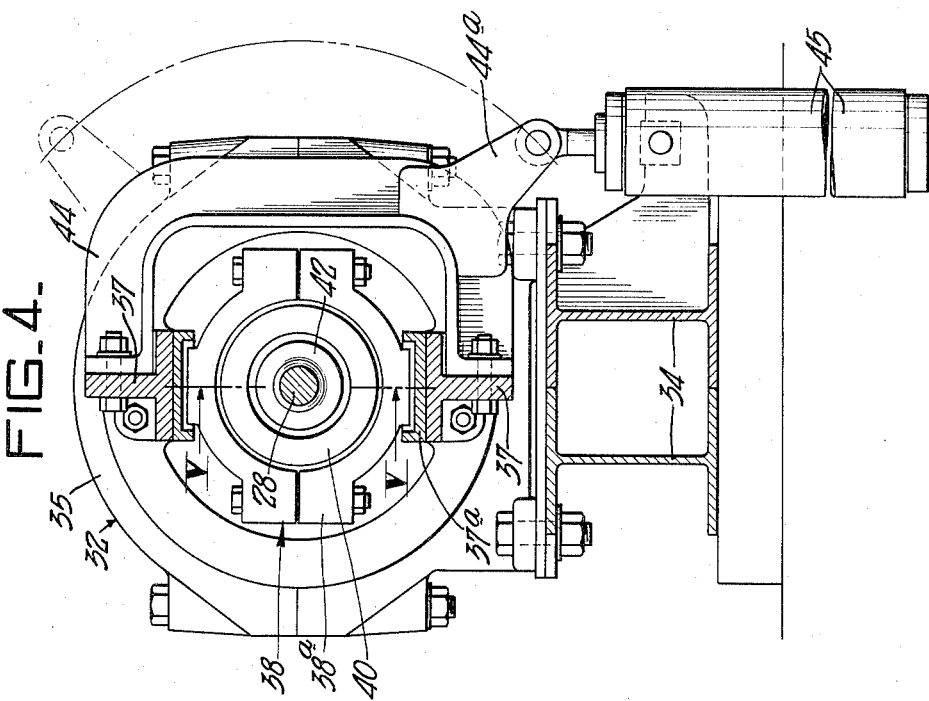
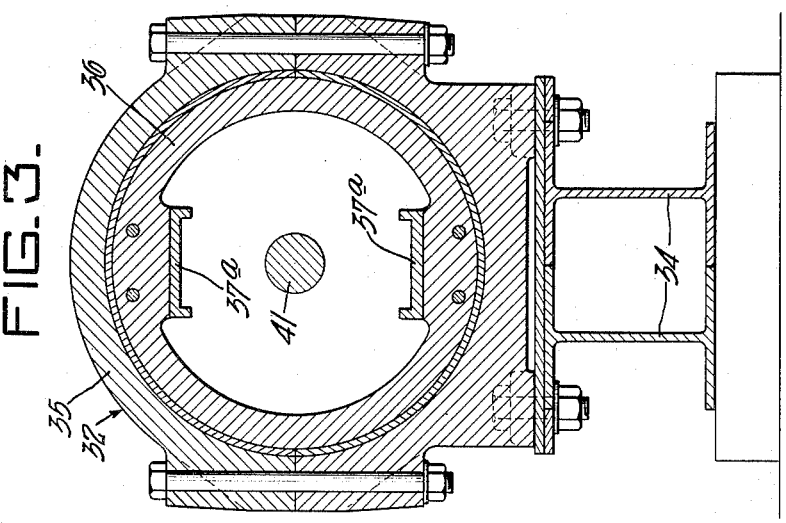

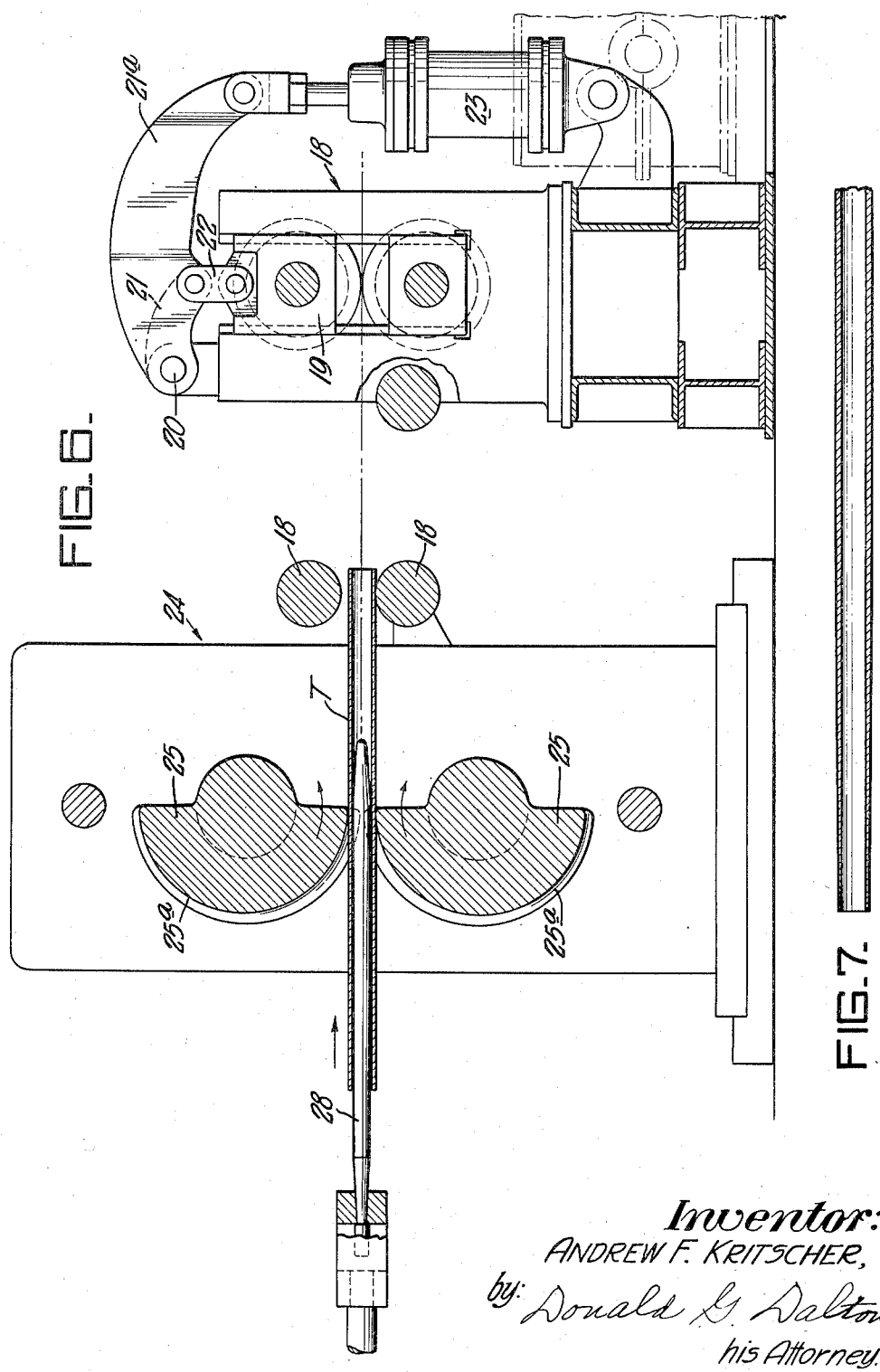

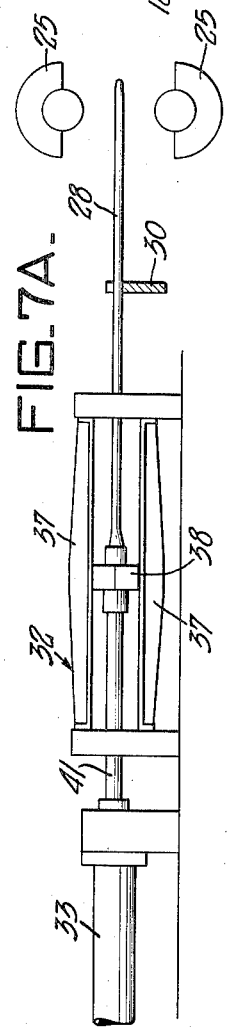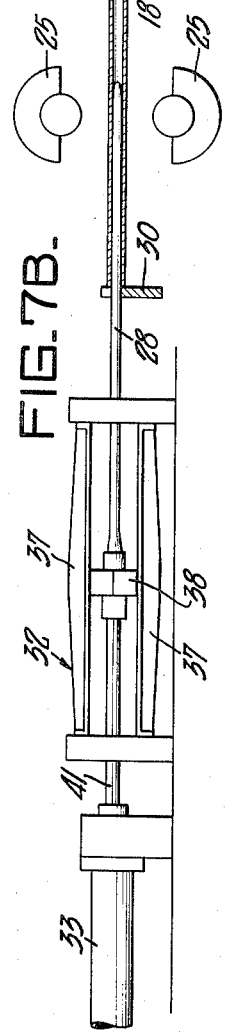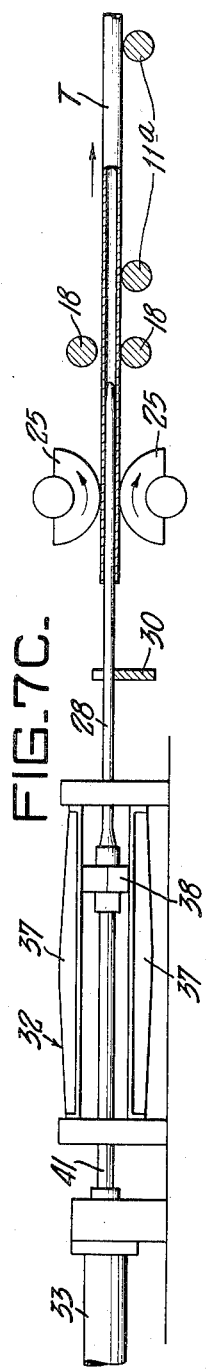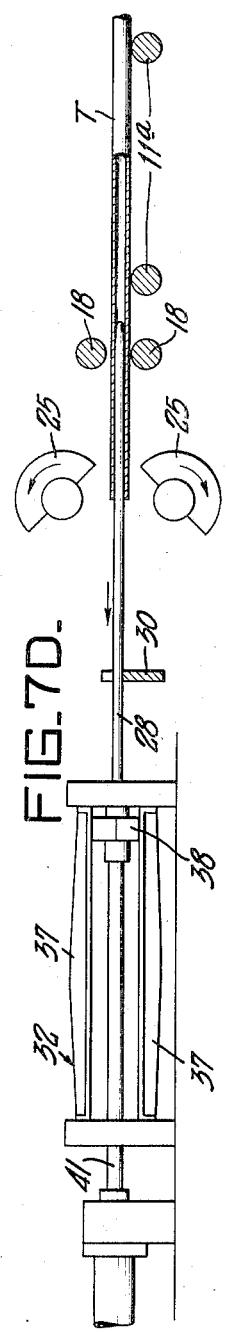

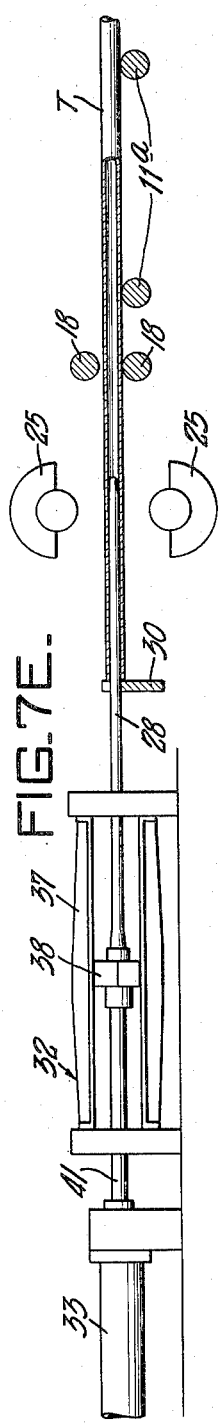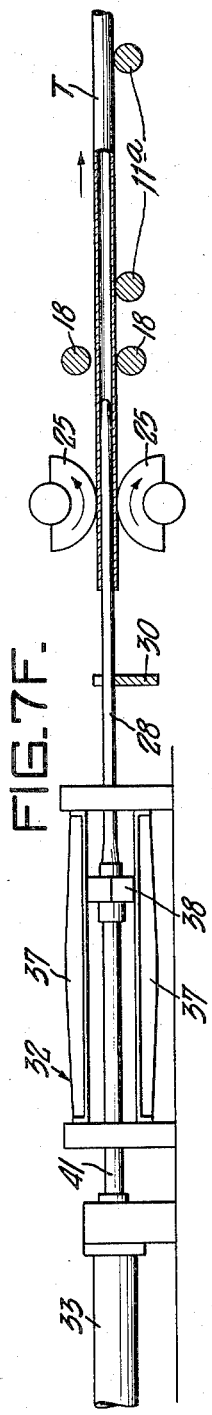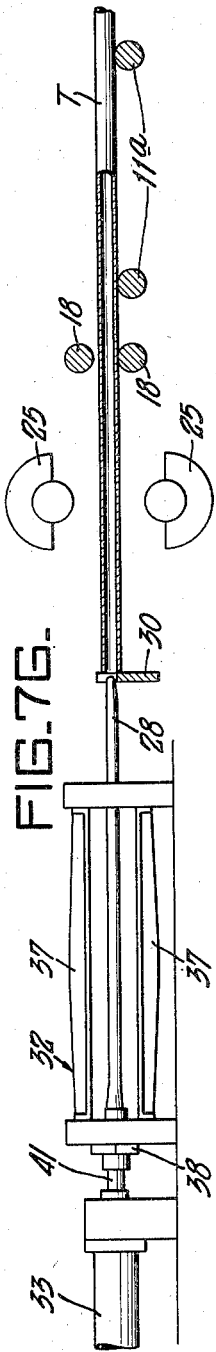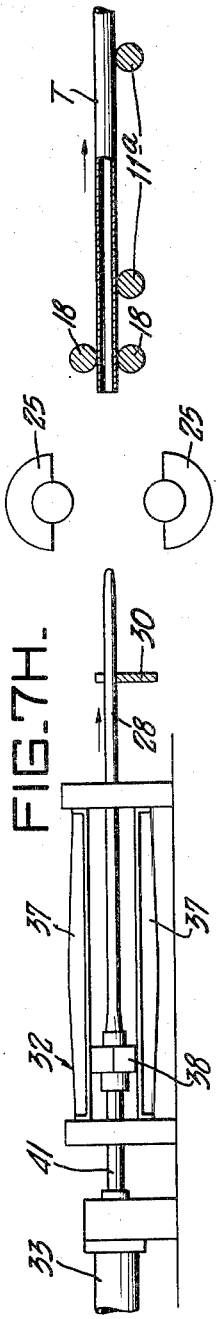
Inventor:
ANDREW F. KRITSCHER,
by: Donald G. Dalton
his Attorney.

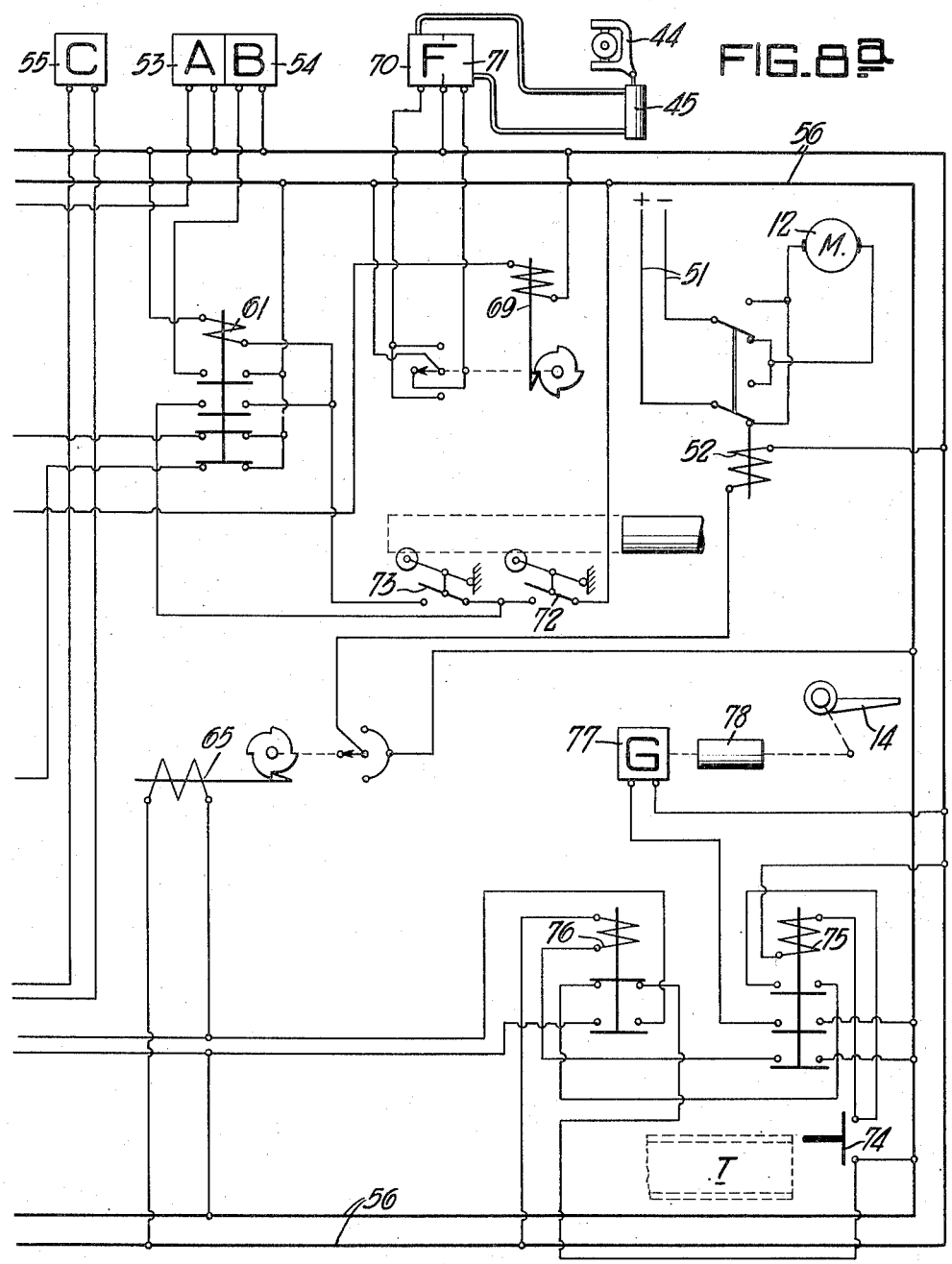

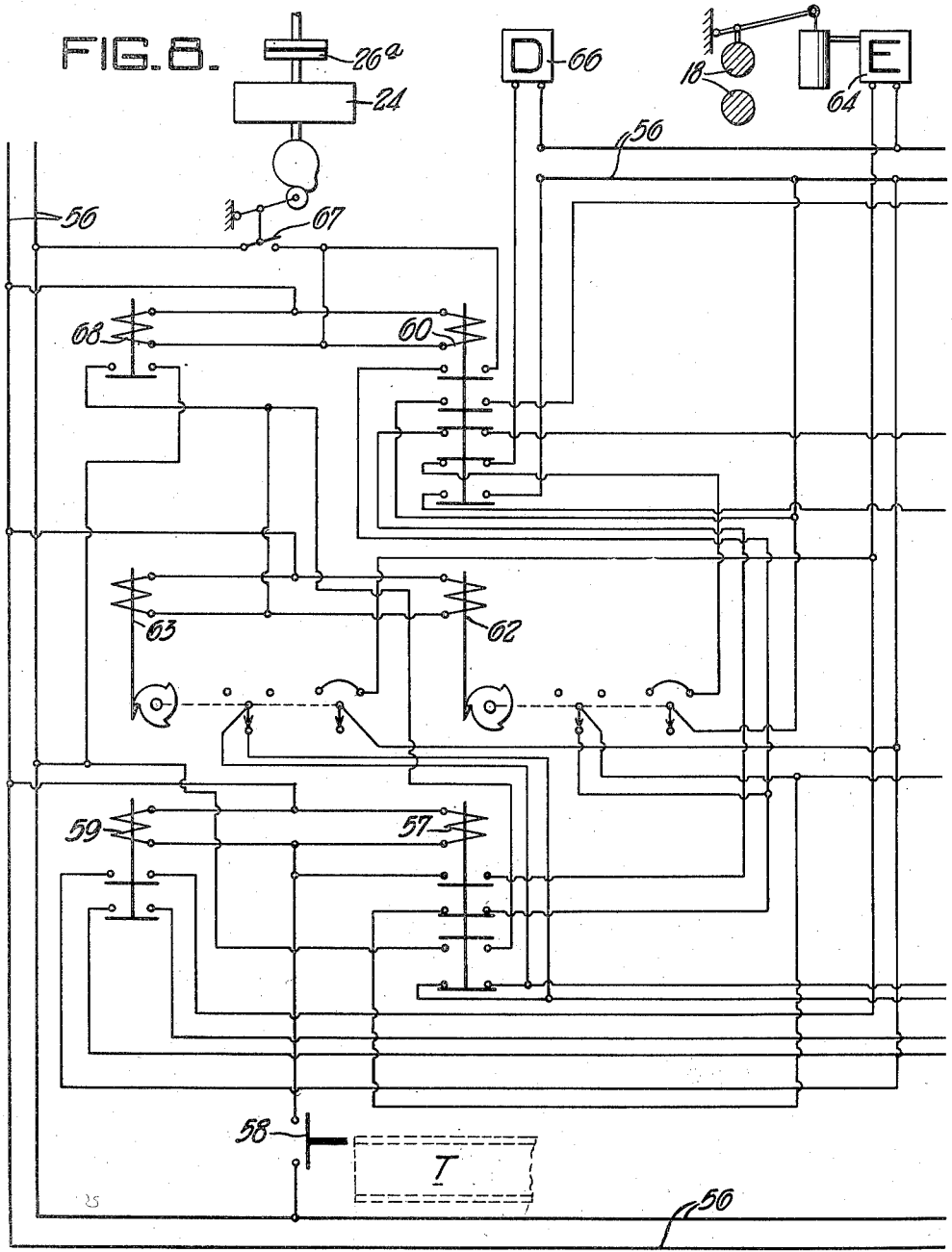

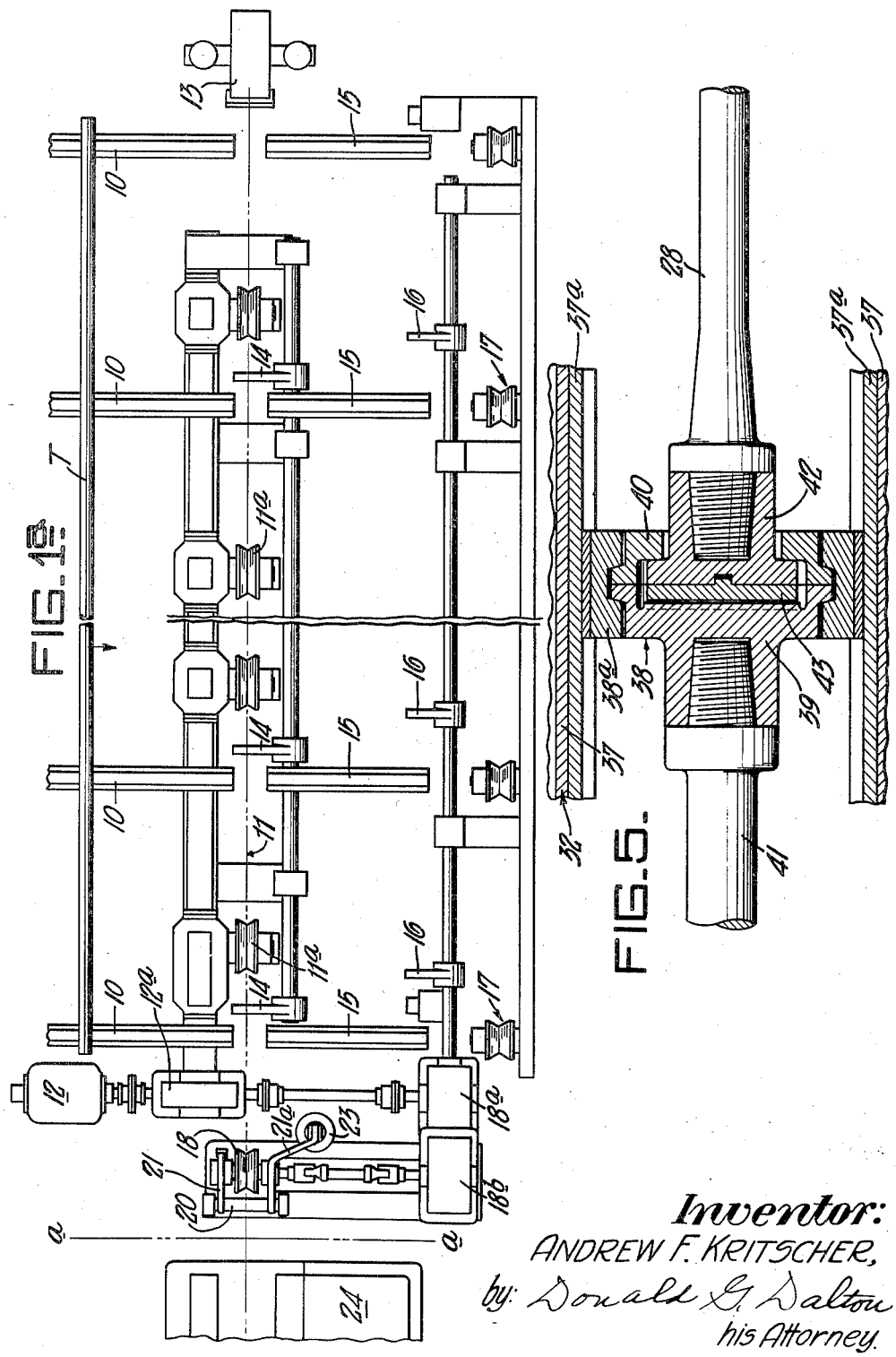

2,780,118
APPARATUS FOR ROLLING TUBES

Andrew F. Kritscher, Pittsburgh, Pa., assignor to United States Steel Corporation, a corporation of New Jersey Application February 5, 1953, Serial No. 335,284

6 Claims. (Cl. 80—14)

This invention relates generally to the manufacture of pipe and tubes and, in particular, to a method and apparatus for decreasing the crop loss which has heretofore been involved in reducing such products to finished size by rolling in a multi-stand mill, i. e., either a conventional sinking mill or a stretch-reducing mill.

It is well known that, in sizing or reducing pipe by hot-rolling without internal support, there is a tendency for a thickening of the wall to occur as well as an elongation of the pipe. The amounts of elongation and wall thickening depend upon the total reduction in the diameter of the blank and the number of rolling-mill stands involved in making the total reduction. Generally the total reduction is equally divided between the number of working stands employed so that the number of stands needed is proportional to the total reduction. Each stand, as it performs its work in reducing the outside diameter of the pipe exerts a circumferential crushing force. Thus the exposed ends of the pipe tend to be more crushed than elongated. This results in a greater wall thickness at the pipe ends than in the portion of the pipe intermediate the ends, since each increment of length other than the ends is supported by the adjacent stands before and after the crushing force of reduction.

Depending on the amount of crushing force or reduction per stand and the number of stands employed in the total reduction, it is apparent that the greater the force and the more often it is applied, the more the wall thickness at the ends will be increased. As the endmost increment is increased, the adjacent increment is affected due to the metal flow, with the result that the excessive wall thickening is transferred back into the body of the pipe. This end effect gradually fades out or becomes stabilized so that, in the body of the pipe the relation of elongation with corresponding wall thickening is constant. However, since the trailing end of the pipe is also free, it is subjected to the crushing force of reduction, and the phenomenon of wall thickening is transferred back along the pipe producing a tapered wall condition on the rear end of the pipe as well as the head end.

In an ordinary reducing or sinking mill, the crushing force or reduction per stand is usually small (3½% maximum), but if a large number of stands are employed, the total reduction can produce a long tapered heavy end. In a stretch-reducing mill, the crushing force or reduction is very large—7 to 12% per stand, and a large number of stands are employed, resulting in a very heavy tapered end section. To further exaggerate the heavy end section is the fact that the wall of the body of the tube is being reduced by stretching rather than being allowed to become thicker with normal elongation, so the thickened end effect is transferred much farther into the tube body. This holds good for the trailing end of the pipe as well. Thus in one size of pipe that is stretch-reduced, the tolerance in wall thickness is from .190" to .220" but the actual wall thickness of the pipe as rolled, at the ends, may be as high as .270".

The scrap loss occasioned by the wall thickening at the ends of the pipe lengths is actually a higher proportion of the total weight of finished product, because of the thickened wall, than would be indicated by the total length cropped, in relation to the original length of the pipe. Thus, while it may be necessary to crop five or six feet from each end of a pipe rolled on a stretch-reducing mill, having a finished length of from one hundred twenty-five to one hundred forty feet (8 or 9% of the original length), the scrap loss will be even greater on a weight basis. In the case of a sinking mill, a crop of one foot may be required at each end of a forty-five foot length of pipe. The actual amount of the scrap loss is substantially constant for a given operation, but the percentage of loss depends on the tube length being rolled.

I have invented a method and apparatus which make it possible to reduce materially the above-described scrap loss. Stated generally, the method of my invention involves successively preshaping the two ends of a semi-finished pipe blank before hot-rolling it to size, so that, when the pipe is rolled to size, the ends will have a wall thickness when finished which is uniform and substantially equal to that of the portion of the pipe length spaced from the ends, whether the pipe is actually rolled under tension, as in a stretch-reducing mill, or without it as in a conventional sinking mill.

More specifically, I roll the ends of the blank on a mandrel to impart a slight taper in the wall thickness from a point inwardly from each end toward the extreme ends. Stated another way, the method provides a blank having a wall thickness adjacent the ends which increases slightly from each extreme end to the original thickness at a point a short distance inwardly thereof. The length and contour of the taper will vary, depending on the subsequent method of rolling to size, in order to compensate for the end thickening of the pipe produced thereby. The length of the taper imparted to the blank is usually in inverse proportion to the desired overall elongation of the blank and the degree of the taper is made sufficient to eliminate the wall-thickening which normally occurs in the absence of preliminary tapering of the blank ends.

The apparatus which I employ to effect the tapering of the pipe wall adjacent the ends includes a gap mill, the rolls of which have grooves of gradually decreasing depth, and a pusher-retractor alined therewith and effective to advance into and through the mill a mandrel, preferably tapered, on which the pipe blank to be processed is initially received. I also provide a cross-head reciprocating along a cage alined with the mandrel, and means for rotating the cage to turn the mandrel on its axis through an angle of 90° before giving the blank a second pass through the mill.

By my method and apparatus it is possible to economically use sinking or stretch-reducing mills in conjunction with tube-blank rolling mills which do not make long lengths, since any cropping would be a bare minimum, regardless of the type of rolling mill prior to the reducing or stretch-reducing mill.

A complete understanding of the invention may be obtained from the following detailed description and explanation which refer to the accompanying drawings illustrating the present preferred embodiment and practice. In the drawings, Figures 1 and 1a constitute a plan view of the apparatus I employ for working the ends of a tube blank to impart a taper to the wall thereof;

Figure 2 is a side elevation, on an enlarged scale, of the gap mill, the pusher-retractor for actuating the mandrel and the cage for rotating the mandrel and the pipe blank thereon 90° about their common axis between successive passes through the mill;

Figure 3 is a transverse section through one end of the cage taken along the plane of line III—III of Figure 2;

Figure 4 is a view partly in elevation and partly in section taken along the plane of line IV—IV of Figure 2;

Figure 5 is a partial axial section through the cross-head taken on the plane of line V—V of Figure 4;

Figure 6 is a central vertical section through the gap mill showing in side elevation a stand of pinch rolls which feed the pipe blank to and from the mill;

Figure 7 is a longitudinal section through one end of a tube blank showing the condition thereof after the tapering operation;

Figures 7A through 7H are a series of diagrammatic views, largely in elevation, illustrating the successive steps of my improved method; and Figures 8 and 8a together constitute a simplified circuit diagram of the control system.

Referring now in detail to the drawings and, for the present, particularly to Figures 1 and 1a, semi-finished tube blanks T having a diameter greater than and wall thickness less or greater than desired in the finished pipe, are delivered successively from a tube-rolling mill while still at a temperature sufficient to facilitate tapering the wall at the ends by rolling, to a set of sloping gravity skids 10 and roll down the latter onto a roller conveyor 11. The conveyor rollers 11a are driven by a motor 12 through reduction gearing 12a and the usual line shaft and bevel gearing. The conveyor is provided with a back stop 13 and a set of kick-out arms 14 adapted to lift successive tube blanks from rollers 11a after having their ends tapered as subsequently described, and deposit them on sloping skids 15. From these skids the blanks are raised by kick-out arms 16 onto a roller conveyor 17 which delivers them to a reheating furnace (not shown) wherein they are brought up to a temperature suitable for further rolling in a stretch-reducing mill to final diameter and wall thickness. Except for the presence of conveyor 11 and its accessories, the apparatus described so far is well known. The novel apparatus involved in my invention is shown to the left of the conveyor and skids 10 and 15, and the subsequent description will refer more specifically thereto.

A stand of pinch rolls 18 alined with conveyor rollers 11a is driven from reduction gearing 12a through further reduction gearing 18a and a pinion stand 18b. As shown in Figure 6, the chocks 19 in which the upper pinch roll in journaled may be raised and lowered to release or grip a tube blank fed toward the pinch rolls by conveyor 11. For this purpose, a crank shaft 20 journaled on top of the pinch roll housings has cranks 21 connected by links 22 to the chocks. One of the cranks has an extension 21a bent to extend laterally of the pinch-roll stand. A fluid-pressure motor 23 has its cylinder pivoted to the base of the pinch-roll stand and its piston rod to the overhanging end of extension 21a, for actuating cranks 21.

A gap mill 24 (Figures 1–2 and 6) has semi-circular rolls 25. A flywheel 26 driven constantly by a motor 24a may be connected by a pneumatic clutch 26a to drive the rolls through gearing 26b. The rolls have cooperating circumferential grooves 25a therein of gradually decreasing depth and a cross-sectional shape which is largely semi-circular, effective to impart an external taper to the wall of a tube blank T traversing the pass defined by the grooves, with a tapering mandrel 28 therein. The taper of the mandrel results in an interior taper of the wall thickness of the rolled blank at the end thereof, in addition to the external taper effected by the roll grooves. While the entire taper may be imparted either to the exterior or interior of the blank, it is preferably divided between them to facilitate the rolling and the removal of the mandrel as hereinatfer described. The tube blank is first entered into the mill in the reverse of the rolling direction and onto the mandrel while the rolls are stationary in their positions most remote from each other. The rolls are then driven toward each other in such direction that, on engaging the blank, they eject it from the mill as it is rolled, in a direction the reverse of that in which it entered.

A trough 29 (Figure 1) fabricated from steel plate affords a mounting for a removable stripper plate 30 and spray-ring support 31, the purpose of which will appear later.

A single pass through the mill tends to deform the end of the pipe blank somewhat in a direction normal to the roll axes, since elongation of the workpiece takes place toward the open end of the pipe due to the walls being decreased without the diameter being increased. This metal displacement between two rolls and a mandrel is accomplished by allowing the metal to go partially into elongation and by allowing side flow to make the end elliptical in shape and tapering the wall thickness. In order to leave the end of the tube blank substantially circular after tapering by the cooperative action of the rolls 25 and mandrel 28, I give it a second pass and provide means for rotating the mandrel and blank 90° on their axis between successive passes. I also provide means for advancing the mandrel to the mill, reciprocating it through the pass with the blank and finally retracting it to strip the blank therefrom. The mandrel-rotating means is a cage 32 in which the aforementioned cross-head reciprocate. A hydraulic motor 33 is the pusher-retractor means.

As shown more clearly in Figures 2 through 4, the cage 32 and motor 33 are mounted on a common base 34. The cage 32 is journaled in spaced bearings 35 and includes a flanged ring 36 rotatable in each. The cage is completed by guide rails or stretcher bars 37 extending between and secured to the rings at diametrically opposite points. The bars have ways 37a on their adjacent faces in which a cross-head 38 is slidable. The cross-head includes a split clamping ring 38a encircling a flanged cup 39 and retainer ring 40 (see Figure 5). Cup 39 has a threaded socket for receiving the end of the piston rod 41 of motor 33. A flanged block 42 retained by ring 40 has a threaded socket into which the end of manderl 28 is secured. A keying disc 43 between the base of cup 39 and the base of block 42 has diametral tongues on the two sides thereof at right angles to each other which fit in grooves in the adjacent faces of the cup and block. Mandrel 28 is thus secured to the cross-head so as to rotate as well as reciprocate therewith.

A yoke 44 (Figures 1–2 and 4) is secured to rails 37 midway of their length and has a crank 44a extending from one side thereof. A fluid-pressure motor 45 has its cylinder pivoted on base 34 and its piston rod pivoted to the crank. When operated, motor 45 serves to rotate the bars 37 through an angle of 90° from the vertical plane in which they are illustrated, to the horizontal plane. This, of course, causes corresponding rotation of the mandrel 28 and the tube blank thereon, preparatory to a second pass through the mill as described above.

Hydraulic motor 33 has inlet connections 46 and 46' at its ends extending to a source of operating fluid under pressure, and including suitable control valves 47 and 47', respectively. Outlet connections 48 and 48' are controlled by valves 49 and 49', respectively. An interconnection 50 between outlets, controlled by a valve 50', normally closed, serves a purpose which will be explained later.

The sequence of operations necessary to effect the desired tapering of the wall of a tube blank adjacent one end will now be explained with reference to Figures 7A—7H, 8 and 8a. The latter show diagrammatically certain elements already described, together with the circuits of the automatic control system. A complete cycle of operations will be followed through and the various pieces of control equipment will be referred to and described in proper order.

First Stage.—Placing tube blank on mandrel

At the start, cross-head 38 is in mid-position as shown in Figure 7A with cage 32 vertical, all control relays are de-energized, all flag switches are open and all sequence switches are in their initial positions, as illustrated. Motor 12 is energized to drive conveyor rollers 11a and pinch rolls 18 in such direction as to feed a tube blank toward gap mill 24 and mandrel 28 and the upper pinch roll is lowered to grip the blank. The circuit for motor 12 to a supply line 51 is closed through the back contacts of a reversing contactor 52. A solenoid 53 which opens valves 47′ and 49 when energized and a solenoid 54 which opens valves 47 and 49′ when energized, are both de-energized. A solenoid 55 which, when energized closes valve 50′, is energized from a supply circuit 56 through the fourth (back) contact of a relay 57. As a result of the closing of this valve, the piston in cylinder 23 and mandrel 28 are locked against axial movement, so long as valves 47, 47′, 49 and 49′ remain closed. A tube blank rolling down skids 10 and landing on conveyor rollers 11a, as shown in Figure 7A, is thus fed to the pinch rolls. These rolls force the blank over the projecting end of mandrel 28. The tube blank continues to advance over the mandrel until its leading end strikes stripper plate 30, as shown in Figure 7B, and operates a flag switch 58 at that point.

Second Stage.—First taper rolling

The closing of switch 58 causes the operation of relay 57 and a second relay 59. Relay 57, by closing its first (front) contact, closes a holding circuit for its winding which includes the third (back) contact of a relay 60 and the third (back) contact of a relay 61. Relay 57, by closing its third (front) contact, energizes the windings of relays 62 and 63. Relay 57 at its fourth contact breaks the circuit of solenoid 55, thus opening valve 50′ permitting free movement of mandrel 28. Relay 59, by closing its first contact, energizes the solenoid 64 of an electromagnetic valve controlling cylinder 23. When the solenoid is energized, fluid is admitted to the lower end of the cylinder to lift the upper roll of pinch-roll stand 18. Relay 59, by its second contact, energizes the winding of a relay 65 which, by pawl and ratchet mechanism, actuates a rotary contact finger step-by-step on successive energizations. The initial energization of the relay moves the finger to second position and energizes the winding of reversing contactor 52 which thereupon reverses motor 12 driving rollers 11a and 18.

Relays 62 and 63, like relay 65, by pawl and ratchet mechanism, actuate rotary contact fingers, step-by-step on successive energizations. Thus the initial energization of the relays causes their rotary contact fingers to move from first to second position. The second finger of relay 62, on reaching the second position energizes the solenoid 66 of an electromagnetic valve controlling clutch 26a, causing flywheel 26 to drive the rolls of mill 24 through gearing 26b. Rotation of the mill rolls, as shown in Figure 7C, effects a tapering draft on the tube wall adjacent the end of the blank. At this time the rails 37 of cage 32 lie in a vertical plane by virtue of the position of the contact finger of a relay 69 controlling solenoids 70 and 71. The second contact finger of relay 63 closes a circuit for solenoid 64 in parallel with that through the first contact of relay 59.

Third Stage.—Retracting tube blank and mandrel and rotating cage

When the taper-rolling of the end of the tube blank has been completed, a cam switch 67 operating in accordance with the rotation of the mill rolls, closes its contact. This energizes the winding of relays 60 and 68. Relay 68 is a time-delay relay and does not close its contact until after the lapse of a few seconds. Relay 60, at its third contact, breaks the holding circuit for relays 57 and 59 (switch 58 having been opened by movement of the tube blank away from stop 30). The windings of relays 62 and 63 are de-energized by the opening of the third contact of relay 57 before relay 68 closes its contact. Similarly the winding of relay 65 is de-energized by the opening of the second contact of relay 59. Nothing happens as a result except that relays 62, 63 and 65 are thereby placed in condition for further operation when their windings are next energized. The operation of relay 60, at its fourth contact, breaks the circuit of solenoid 66, releasing clutch 26a whereupon the mill rolls are stopped by a friction brake (not shown) after a slight residual travel sufficient to permit switch 67 to open. This does not affect the energization of relays 60 and 68 because a holding circuit therefor is closed through the first contact of relay 60, the second contact of relay 57 and the fourth contact of relay 61.

Solenoid 55 is re-energized by the closing of the fourth contact of relay 57 and closes valve 50′. Solenoid 64 remains energized through the second contact finger of relay 63, holding the pinch rolls 18 open. Contactor 52 remains energized through the contact finger of relay 65 in second position. Motor 12 therefore continues to drive conveyor rollers 11a and pinch rolls 18 in the reverse direction.

Relay 60, at its second contact, energizes solenoid 53 which opens valves 47′ and 49 causing cylinder 33 to move mandrel 28 to the left, from the position shown in Figure 7D to that shown in 7E. The tube blank, by reason of its frictional grip on the mandrel, skids on the conveyor rollers turning in reverse direction. Relay 60 at its fifth contact energizes relay 69 which is similar to relay 65. The rotation of the contact finger of relay 69 energizes a solenoid 70 and de-energizes a solenoid 71. These solenoids, respectively, operate valves controlling the admission of air under pressure to opposite ends of cylinder 45. Energization of solenoid 70 thereby causes the cage 32 to be turned from vertical to horizontal position while energization of solenoid 71 effects the reverse movement. The solenoids are alternately energized and de-energized by successive steps of rotation of the finger of relay 69. At the start, relay 69 is in position to energize solenoid 71 so that cylinder 45 maintains the cage in a vertical plane. By energization of solenoid 70, therefore, the tube blank is rotated with the cage through 90° as it approaches stop 30 the second time, in preparation for another taper-rolling operation. This is necessary because the first pass through mill 25 flattens down the tube end and leaves the portions of the circumference of the blank lying in the horizontal plane substantially unaffected.

Fourth stage.—Second taper-rolling

After the expiration of the time for which it is set (about 2.2 sec.) relay 68 closes its contact which again energizes relays 62 and 63. The time delay is set so that relay 68 closes its contact slightly before the tube blank again closes switch 58. Thus the contact fingers of relays 62 and 63 are in third position when switch 58 is re-closed. The closing of switch 58 again energizes relays 57 and 59. Relay 59 at its second contact energizes relay 65 but the resulting rotation of the latter's contact finger merely maintains the circuit for contactor 52. The opening of the second contact of relay 57 breaks the holding circuit for relays 60 and 68 which are thereby de-energized. Relay 60 at its second contact opens the circuit of solenoid 53 thereby closing valves 47′ and 49. Relays 62 and 63 remain energized through the third contact of relay 57 after the contact of relay 68 is opened. Relay 57 at its fourth contact opens the circuit of solenoid 55 and this opens valve 50′ again permitting the piston in cylinder 23 to move freely. Relay 63, through its second contact finger, maintains solenoid 64 energized thus keeping the pinch rolls 18 open. Contactor 52 remains energized so motor 12 continues to drive the conveyor rollers 11a in such direction as to tend to move the tube blank away from mill 25.

The de-energization of relay 60, at its fourth contact again completes a circuit through the second contact finger of relay 62 for solenoid 66 which operates clutch 26a, to cause flywheel 26 to drive the rolls of mill 25. The end of the tube is thus again subjected to a wall-tapering reduction, as shown in Figure 7F, the second draft being applied at right angles to the first. The opening of contact 58 has no effect since a holding circuit for relays 57 and 59 is completed through the first contact of relay 57 and the third contacts of relays 60 and 61.

*Fifth stage.—Stripping blank from mandrel*

When the mill rolls complete their revolution, cam-operated switch 67 is again closed, energizing relays 60 and 68. The opening of the third contact of relay 60 breaks the holding circuit for relays 57 and 59 and they are de-energized. Solenoid 55 is thereby re-energized through the fourth contact of relay 57 and valve 50 is closed. Relay 60 at its fourth contact de-energizes solenoid 66 and the mill rolls come to rest after turning sufficiently by their momentum to open switch 67. Solenoid 53 is again energized by the closing of the second contact of relay 60 and valves 47' and 49 are thereby opened. Mandrel 28 is thus moved to the left, as shown in Figure 7G, since solenoid 55 is energized through the fourth contact of relay 57, and valve 50' is closed. The tube blank again skids over the conveyor rollers 11a which continue to be driven in reverse direction. Relay 69 is energized by the closing of the fifth contact of relay 60. Solenoid 71 is thereby de-energized and solenoid 70 energized so cylinder 45 returns cage 32 to its normal vertical position.

The movement of the mandrel continues until the tube blank strikes stop 30 and closes switch 58 again. Slightly before this, the operation of relay 68 after its pre-set time delay, energizes relays 62 and 63. The closing of switch 58 energizes relays 57 and 59. Solenoid 64 therefore remains energized through the first contact of relay 59. Relays 60 and 68 remain energized through the first contact of relay 60, the first contact finger of relay 62 and the fourth contact of relay 61. As a result, solenoid 53 remains energized. Solenoid 55 remains energized through the first contact finger of relay 63 and valve 50' remains closed. Thus leftward movement of the mandrel continues but movement of the tube blank is arrested by stop 30 so the blank is thereupon stripped from the mandrel as shown in Figure 7G. As soon as the blank is free from the mandrel, it is moved to the right by the reverse rotation of the conveyor rollers 11a. The holding circuit for relays 57 and 59 being open at the third contact of relay 60, relays 57 and 59 are de-energized when switch 58 opens. Relay 59 thereupon breaks the circuit of solenoid 64 and this causes closing of pinch rolls 18.

*Sixth stage.—Delivery of twice-rolled blank and return to starting conditions*

When the mandrel reaches its extreme retracted position, a coating of lubricant is applied thereto by spray ring 31. As the mandrel approaches the end of its stroke, an extension on the piston rod of cylinder 33 operates flag switches 72 and 73 successively. The closing of these switches energizes relay 61 which at its second contact closes a holding circuit through switch 72. By opening its fourth contact, relay 61 breaks the holding circuit of relays 60 and 68. Solenoid 53 is thus de-energized and valves 47' and 49 are closed. Relay 61 at its first contact energizes solenoid 54 opening valves 47 and 49 and causing mandrel 28 to move to the right, as shown in Figure 7H. As the end of the piston rod extension passes switch 72, the opening of the latter de-energizes relay 61 and solenoid 54. This closes valves 47 and 49' and locks the piston of cylinder 33 since valves 47, 49 and 50 are closed.

Reverse travel of the tube blank along conveyor 11 continues until the blank closes a flag switch 74. This energizes a slow-release relay 75. The latter at its first contact, closes a holding circuit through the first contact of a relay 76. The second contact of relay 75 energizes a solenoid 77 controlling a cylinder 78 operating the kickout arms 14. Through its third contact, relay 75 energizes relay 76 which operates only after a time sufficient to permit the tube blank to be kicked off of conveyor 11 by arms 14. When it operates, relay 76, at its first contact, opens the holding circuit for relay 75 and at its second contact, energizes relay 65. The contact finger of the latter de-energizes contactor 52 and conveyor rollers 11a and pinch rolls 18 are then driven in such direction as to advance a tube blank toward mill 24. When relay 75 opens its contacts after a short time delay, its second contact breaks the circuit of solenoid 77 and its third contact breaks the circuit of relay 76. The control system is thus restored to its starting condition.

After subjecting one end of the tube blank to a wall-tapering operation as above described, the other end may be similarly treated in duplicate equipment (not shown) or by turning the blank end for end and repeating the operation in the apparatus illustrated. Thereafter, the blanks are sent through a reheating furnace as aforesaid and then rolled in a conventional sinking or a stretch-reducing mill which brings them to the desired final diameter and wall thickness. The final product will be observed to have a wall thickness adjacent the ends substantially equal to the wall thickness at all points intermediate the ends, by virtue of the taper imparted to the wall of the blanks adjacent their ends prior to final rolling. This materially reduces the length of the crop which must be taken from both ends of the finished tube.

Although I have disclosed herein the preferred embodiment and practice of my invention, I intend to cover as well any change or modification therein which may be made without departing from the spirit and scope of the invention.

I claim:

1. Apparatus for manipulating a mandrel, comprising an elongated cage of spaced parallel bars disposed horizontally, spaced coaxial bearings connecting and supporting said bars for rotation about the common axis of said bearings, a cross-head, means slidably and non-rotatably mounting said cross-head in said cage for movement longitudinally of said bars, a mandrel mounted on said cross-head, means for reciprocating said cross-head and means for effecting limited rotation of the cage.

2. Apparatus defined by claim 1 characterized by said last-mentioned means including a yoke spanning the bars of said cage transversely and means connected to said yoke effective to oscillate it and said cage through a predetermined angle.

3. Apparatus defined by claim 1 characterized by said cross-head reciprocating means being a fluid-pressure cylinder and piston, the cross-head being secured to the end of the piston rod thereof.

4. Apparatus defined by claim 1 characterized by said cage-rotating means being a fluid-pressure cylinder and piston pivotally mounted adjacent the cage.

5. Mandrel-manipulating apparatus comprising annular bearings spaced along a common axis, an elongated cage consisting of spaced end rings connected by spaced parallel bars, said end rings being journaled in said bearings, a cross-head reciprocably mounted in said cage on said bars, a mandrel mounted coaxially on said cross-head, a yoke spanning said cage transversely thereof and fixed thereto, and means for oscillating said yoke to turn said cage and mandrel on their axis through a predetermined angle.

6. Mandrel-manipulating apparatus as defined by claim 5 characterized by said cage including guide rails mounted on said bars and extending between said rings having ways thereon in which said cross-head slides.

References Cited in the file of this patent

UNITED STATES PATENTS

| | | |
|---|---|---|
| 1,810,885 | Neuberth | June 16, 1931 |
| 1,833,990 | Dreyer | Dec. 1, 1931 |
| 1,982,472 | Heetkamp | Nov. 27, 1934 |
| 1,983,934 | Devine | Dec. 11, 1934 |
| 2,005,310 | Bark | June 18, 1935 |
| 2,005,657 | Ludwig | June 18, 1935 |
| 2,021,686 | Gassen | Nov. 19, 1935 |
| 2,054,370 | Gross | Sept. 15, 1936 |
| 2,161,065 | Krause | June 6, 1939 |
| 2,256,426 | Damien | Sept. 16, 1941 |
| 2,356,734 | Bannister | Aug. 29, 1944 |
| 2,560,934 | Coe | July 17, 1951 |

FOREIGN PATENTS

| | | |
|---|---|---|
| 521,445 | Germany | Mar. 23, 1931 |
| 590,576 | Germany | Jan. 5, 1934 |

OTHER REFERENCES

Ser. 358,173, Dorn (A. P. C.), published May 4, 1943.